(12) United States Patent
Li et al.

(10) Patent No.: US 12,397,681 B2
(45) Date of Patent: Aug. 26, 2025

(54) METHOD FOR HEATING A BATTERY PACK, BATTERY HEATING SYSTEM AND ELECTRIC APPARATUS

(71) Applicant: CONTEMPORARY AMPEREX TECHNOLOGY (HONG KONG) LIMITED, Hong Kong (CN)

(72) Inventors: Zhanliang Li, Ningde (CN); Yuanmiao Zhao, Ningde (CN); Xiyang Zuo, Ningde (CN); Xiaojian Huang, Ningde (CN); Zhimin Dan, Ningde (CN); Yu Yan, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 642 days.

(21) Appl. No.: 17/562,259

(22) Filed: Dec. 27, 2021

(65) Prior Publication Data
US 2023/0062270 A1    Mar. 2, 2023

Related U.S. Application Data

(63) Continuation of application No. PCT/CN2021/115586, filed on Aug. 31, 2021.

(51) Int. Cl.
*B60L 58/20* (2019.01)
*B60L 58/12* (2019.01)
(Continued)

(52) U.S. Cl.
CPC ............ *B60L 58/27* (2019.02); *B60L 58/12* (2019.02); *H01M 10/615* (2015.04);
(Continued)

(58) Field of Classification Search
CPC .. H01M 10/615; H01M 10/63; H01M 50/249; H01M 2220/20; H02J 7/0047; B60L 58/27; B60L 58/24
See application file for complete search history.

(56) References Cited

U.S. PATENT DOCUMENTS

| | | | | |
|---|---|---|---|---|
| 2005/0264257 A1* | 12/2005 | Inui | ......................... | B60L 58/24 320/104 |
| 2016/0072320 A1* | 3/2016 | Kanda | .................. | G01R 19/165 320/134 |

(Continued)

FOREIGN PATENT DOCUMENTS

| | | |
|---|---|---|
| CN | 106450586 A | 2/2017 |
| CN | 107666026 A | 2/2018 |

(Continued)

OTHER PUBLICATIONS

Notification of Registration and Grant of Patent for Invention dated Dec. 3, 2023 received in Chinese Patent Application No. CN 202180036002.4.

(Continued)

*Primary Examiner* — Nicholas A Smith
*Assistant Examiner* — Ziheng Lu
(74) *Attorney, Agent, or Firm* — Scully, Scott, Murphy & Presser, P.C.

(57) ABSTRACT

The present application relates to a method for heating a battery pack, where the battery pack is connected to an inductive load via a converter and the method includes: controlling on and off of a switch module in the converter upon receiving a heating request, so as to control discharging and charging between the battery pack and the inductive load, connecting the battery pack and an auxiliary heating mechanism in parallel during a discharging stage of the battery pack; and disconnecting the auxiliary heating mechanism from the battery pack during a charging stage of the (Continued)

battery pack. The present application further relates to a battery heating system and an electric apparatus.

19 Claims, 6 Drawing Sheets

(51) Int. Cl.
*B60L 58/27* (2019.01)
*H01M 10/615* (2014.01)
*H01M 10/625* (2014.01)
*H01M 10/63* (2014.01)
*H01M 50/249* (2021.01)

(52) U.S. Cl.
CPC ......... *H01M 10/625* (2015.04); *H01M 10/63* (2015.04); *H01M 50/249* (2021.01); *H01M 2220/20* (2013.01)

(56) References Cited

U.S. PATENT DOCUMENTS

| | | |
|---|---|---|
| 2019/0363563 A1 | 11/2019 | Zhang et al. |
| 2020/0212520 A1 | 7/2020 | Dan et al. |
| 2021/0043990 A1 | 2/2021 | Dan et al. |
| 2021/0111451 A1* | 4/2021 | Lantzsch ............. H01M 10/654 |
| 2021/0126292 A1* | 4/2021 | Ogaki ..................... B60L 1/02 |
| 2021/0126302 A1 | 4/2021 | Hooper et al. |
| 2021/0245628 A1 | 8/2021 | Zuo et al. |
| 2021/0354592 A1 | 11/2021 | Zuo et al. |
| 2021/0354593 A1* | 11/2021 | Wang ..................... B60L 58/27 |

FOREIGN PATENT DOCUMENTS

| | | | | |
|---|---|---|---|---|
| CN | 110015202 A | | 7/2019 | |
| CN | 110962631 A | | 4/2020 | |
| CN | 110962692 A | | 4/2020 | |
| CN | 110970672 A | * | 4/2020 | .............. B60L 15/20 |
| CN | 110970690 A | | 4/2020 | |
| CN | 110970965 A | | 4/2020 | |
| CN | 111347925 A | * | 6/2020 | ............ H01M 10/44 |
| CN | 111660875 A | | 9/2020 | |
| CN | 112373351 A | | 2/2021 | |
| CN | 112601297 A | | 4/2021 | |
| DE | 102011089955 A1 | * | 6/2013 | .......... H01M 10/425 |
| EP | 3674132 A1 | | 7/2020 | |
| JP | 2008125199 A | | 5/2008 | |
| JP | 2013030394 A | | 2/2013 | |
| JP | 2016052158 A | | 4/2016 | |
| JP | 2016524786 A | | 8/2016 | |
| JP | 2017091847 A | | 5/2017 | |
| JP | 6341209 B2 | | 6/2018 | |
| JP | 2021002513 A | | 1/2021 | |
| WO | 2017125207 A1 | | 7/2017 | |

OTHER PUBLICATIONS

Notice of Reasons for Refusal dated Oct. 30, 2023 received in Japanese Patent Application No. JP 2021-576388.
International Search report and Written Opinion dated May 27, 2022 received in International Application No. PCT/CN2021/115586.
Extended European Search Report dated Mar. 20, 2023 received in European Patent Application No. EP 21815346.8.

* cited by examiner

METHOD FOR HEATING A BATTERY PACK, BATTERY HEATING SYSTEM AND ELECTRIC APPARATUS

CROSS-REFERENCE TO RELATED APPLICATIONS

This application is a continuation of International Application No. PCT/CN2021/115586, filed on Aug. 31, 2021, the disclosure of which is hereby incorporated by reference in its entirety.

TECHNICAL FIELD

The present application relates to the technical field of batteries, and in particular, relates to a method for heating a battery pack, a battery heating system and an electric apparatus.

BACKGROUND

With the development of the new energy techniques, a battery is employed as a power in increasing fields. Due to such advantages as high energy density, recyclable charging, security, and environmental protection, the battery has been widely applied to such fields as new energy automobiles, consumer electronics and energy storage systems.

However, the battery is limited to a certain extent upon being used in a low-temperature environment. Specifically, in the low-temperature environment, a charging and discharging capacity of the battery will attenuate seriously. Charging and discharging the battery will cause the life decay during the entire life cycle and charging the battery may even causing irreversible damage to the battery. Therefore, in order to be able to use the battery normally, it is necessary to heat the battery in the low-temperature environment.

SUMMARY

In view of the above problem, the present application proposes a method for heating a battery pack, a battery heating system and an electric apparatus to solve the problem of the battery which is limited upon being used in a low-temperature environment.

For this purpose, a first aspect of the present application provides a method for heating a battery pack, where a battery pack is connected to an inductive load via a converter and the method includes:

controlling on and off of a switch module in the converter when receiving a heating request, so as to control discharging and charging between battery pack and inductive load;

connecting the battery pack and an auxiliary heating mechanism in parallel during a discharging stage of the battery pack; and disconnecting the auxiliary heating mechanism from the battery pack during a charging stage of the battery pack.

In the embodiment of the present application, the internal heating of the battery and the external auxiliary heating mechanism are combined to further increase the heating speed and shorten the heating time. Specifically, in the charging and discharging process of the battery, a charging current and a discharging current flows through internal resistor of the battery to generate heat for heating the inside of the battery. During the discharging stage of the battery, the battery is heated outside by connecting the battery to the auxiliary heating mechanism in parallel. During the charging stage of the battery, the auxiliary heating mechanism is not used for heating the battery. Since the current flowing through the converter and the inductive load is limited, during the discharging stage of the battery, the battery is connected to the auxiliary heating mechanism in parallel. The solution not only adds an external heating source, but also increases a discharging current flowing through the internal resistor, thereby increasing a heating efficiency. In addition, during the charging stage of the battery, energy of the charging is from energy stored by the inductive load during the discharging stage. Since a heat generating efficiency of the internal resistor of the battery under a same voltage is greater than a heat generating efficiency of the external auxiliary heating mechanism, thus the auxiliary heating mechanism is disconnected during the charging stage of the battery, so that all energy of the inductive load is used for charging, so that the heating efficiency is optimal.

In some embodiments, the method includes:
collecting a current parameter relating to heating battery pack; and
adjusting durations of the charging stage and the discharging stage of a charging and discharging cycle of the battery pack based on a preset desired current threshold range, so as to enable current parameter to return to the preset desired current threshold range, when the current parameter relating to heating battery pack exceeds the preset desired current threshold range.

In some embodiments, the current parameter includes one or more of following items: a current of a terminal of the battery pack, a DC bus current of the converter and each phase current of the converter. The current of the terminal of the battery pack includes a current flowing through the auxiliary heating mechanism and a DC bus current of the converter. A person skilled in the art should understand that limitation to the current of the terminal of the battery pack is actually limitation to a charging and discharging current of the battery, so as to prevent the battery from being charged and discharged with an excessively large current and causing irreversible damage to the battery. In addition, by limiting each phase current of the converter, on one hand, the phase current is prevented from exceeding an upper current limit of a power device in the converter, and on the other hand, the current of the inductive load is prevented from entering its current-saturated region. Specifically, in some embodiments, when the current parameter exceeds a preset current threshold, a desired frequency and a desired duty cycle of a driving signal of the power device in the converter are calculated and obtained based on the preset current threshold, and the frequency and the duty cycle of the driving signal are adjusted to the desired frequency and the desired duty cycle, thus adjusting durations of the charging stage and the discharging stage of each charging and discharging cycle of the battery pack.

In some embodiments, the preset desired current threshold range represents a permission range of a heating current in the heating process. In one embodiment, the preset desired current threshold range can be a current range with a desired heating current as a middle value. Illustratively, the desired heating current can be a desired DC bus current of the converter.

In some embodiments of the present application, the durations of the charging stage and the discharging stage of the charging and discharging cycle of the battery pack are equal to each other. By setting the durations of the charging stage and the discharging stage of each charging and discharging cycle to be equal to each other, all energy stored in the inductive load during the discharging stage is made to be fed back to the battery pack during the charging stage. In such an embodiment, all energy in the inductive load is fed back to the battery pack, on one hand, the energy consumption of the battery pack is minimized, and on the other hand, it avoids excessive unbalanced discharge of the battery pack at low temperatures, and avoids the polarization of the battery due to the deviation of the electrode potential from the equilibrium electrode potential, thereby avoiding irreversible damage to the battery. A person skilled in the art should understand that different adjusting policies can be employed to drive the converter according to actual requirements and working conditions. Therefore, the durations of the charging stage and the discharging stage of each charging and discharging cycle can be set as unequal values.

In some embodiments of the present application, the inductive load is a winding of a motor and a switch module in the converter is disposed to be turned on or off periodically to cause the motor not to rotate. A person skilled in the art should understand that when the battery pack is a driving energy source of the motor, according to actual applications, the motor can be a single phase motor or a multi-phase motor and the motor can be an AC motor or a DC motor. Specifically, when the motor is a three-phase asynchronous motor, a three-phase synchronous motor or a DC brushless motor, the inductive load can be a stator winding of the motor. When the motor is the DC brush motor etc., the inductive load can be a rotor winding of the motor.

In some embodiments of the present application, the motor is a three-phase motor and the converter is a three-phase full-bridge circuit having a first phase bridge arm, a second phase bridge arm and a third phase bridge arm;

where during the discharging stage of the charging and discharging cycle of the battery pack, closing two or three switch modules, the closed switch modules are located at different phase bridge arms, and closing at least one switch module located on an upper bridge arm and at least one switch module located on a lower bridge arm; and during the charging stage of the charging and discharging cycle of the battery pack, disconnecting the switch modules closed during the discharging stage, and closing a switch module of the lower bridge arm or the upper bridge arm relative to the upper bridge arm or the lower bridge arm where the switch modules closed during the discharging stage are located.

It should be understood that the number of phases for the converter can correspond to the number of phases for the motor. For example, when the motor is a four-phase motor, the converter can be a four-phase converter.

In some embodiments of the present application, the above method includes:

obtaining a state parameter of the battery pack;
obtaining a temperature of the converter and a temperature of the motor;
generating a heating stop request when the state parameter, the temperature of the converter or the temperature of the motor exceed a corresponding parameter security range, where the state parameter includes at least one of following parameters: a voltage, a temperature, a state of charge and an insulation resistance; and
controlling all switch modules of the converter to be in an off state and disconnecting the auxiliary heating mechanism from the battery pack in response to the heating stop request.

In some embodiments of the present application, the method includes:

obtaining state information of a vehicle where battery pack is mounted;
generating a heating stop request when the state information indicates that the vehicle is not in a heating condition, where the state information includes at least one of following parameters: a vehicle starting state, a vehicle door state, collision information, a high-voltage-up state, and an ambient temperature; and
controlling all switch modules of the converter to be in an off state and disconnecting the auxiliary heating mechanism from the battery pack in response to the heating stop request In some embodiments of the present application, the auxiliary heating mechanism is a heating film. In some other embodiments of the present application, the auxiliary heating mechanism is a positive temperature coefficient (PTC) heater, i.e. a PTC heater.

In some embodiments of the present application, the auxiliary heating mechanism is connected in parallel to the battery pack directly and the parallel connection between the auxiliary heating mechanism and the battery pack is controlled through a switch between the auxiliary heating mechanism and the battery pack. In some other embodiments of the present application, the auxiliary heating mechanism is connected in parallel to the battery pack through a DC-DC converter and the parallel connection between the auxiliary heating mechanism and the battery pack is controlled through a switch between the auxiliary heating mechanism and the DC-DC converter. Voltages at two ends of the auxiliary heating mechanism can be adjusted through the DC-DC converter to control a heating current and a heating power of the auxiliary heating mechanism.

A second aspect of the present application provides a battery heating system, the battery heating system including:

a converter, where a direct current end of the converter is connected to a positive electrode and a negative electrode of a battery pack;
an inductive load, connected to an alternating current end of the converter;
an auxiliary heating mechanism, connected to the battery pack in parallel; and
a controller, where the controller is respectively connected to the converter and inductive load, and where controller is configured to:
control on and off of a switch module in the converter in response to a heating request, so as to control discharging and charging between the battery pack and the inductive load;
connect the auxiliary heating mechanism and the battery pack in parallel during a discharging stage of the battery pack; and
disconnect the auxiliary heating mechanism from the battery pack during a charging stage of the battery pack.

In the embodiment of the present application, the internal heating of the battery and the external auxiliary heating mechanism are combined to further increase the heating speed and shorten the heating time. Specifically, in the charging and discharging process of the battery, a charging current and a discharging current flows through internal resistor of the battery to generate heat for heating the inside of the battery. During the discharging stage of the battery, the battery is heated outside by connecting the battery to the auxiliary heating mechanism in parallel. During the charging stage of the battery, the auxiliary heating mechanism is not used for heating the battery. Since the current flowing through the converter and the inductive load is limited, thus during the discharging stage of the battery, the battery is connected in parallel to the auxiliary heating mechanism. The solution not only adds an external heating source, but also increases a discharging current flowing through the internal resistor, thereby increasing a heating efficiency. In addition, during the charging stage of the battery, energy of the charging is from energy stored by the inductive load during the discharging stage. Since a heat generating efficiency of the internal resistor of the battery under a same voltage is greater than a heat generating efficiency of the external auxiliary heating mechanism, thus the auxiliary heating mechanism is disconnected during the charging stage of the battery, so that all energy of the inductive load is used for charging, so that the heating efficiency is optimal. This kind of implementation has strong portability, makes full use of the original auxiliary heating components, and only needs to adapt the software without adding new hardware.

In some embodiments of the present application, the controller is configured to:
  collect a current parameter relating to heating the battery pack; and
  adjust durations of the charging stage and the discharging stage of a charging and discharging cycle of the battery pack based on a preset desired current threshold range, so as to enable current parameter to return to the preset desired current threshold range, when the current parameter relating to heating the battery pack exceeds the preset desired current threshold range.

In some embodiments, the current parameter includes one or more of following items: a current of a terminal of the battery pack, a DC bus current of the converter and each phase current of the converter. The current of the terminal of the battery pack includes a current flowing through the auxiliary heating mechanism and a DC bus current of the converter. A person skilled in the art should understand that limitation to the current of the terminal of the battery pack is actually limitation to a charging and discharging current of the battery, so as to prevent the battery from being charged and discharged with an excessively large current and causing irreversible damage to the battery. In addition, by limiting each phase current of the converter, on one hand, the phase current is prevented from exceeding an upper current limit of a power device in the converter, and on the other hand, the current of the inductive load is prevented from entering its current-saturated region. Specifically, in some embodiments, when the current parameter exceeds the preset current threshold, a desired frequency and a desired duty cycle of a driving signal of the power device in the converter are calculated and obtained based on the preset current threshold, and the frequency and the duty cycle of the driving signal are adjusted to the desired frequency and the desired duty cycle, thus adjusting durations of the charging stage and the discharging stage of each charging and discharging cycle of the battery pack.

In some embodiments, the preset desired current threshold range represents a permission range of a heating current in the heating process. In one embodiment, the preset desired current threshold range can be a current range with a desired heating current as a middle value. Illustratively, the desired heating current can be a desired DC bus current of the converter.

In some embodiments of the present application, the durations of the charging stage and the discharging stage of the charging and discharging cycle of the battery pack are equal to each other. By setting the durations of the charging stage and the discharging stage of each charging and discharging cycle to be equal to each other, all energy stored in the inductive load during the discharging stage is made to be fed back to the battery pack during the charging stage. In such an embodiment, all energy in the inductive load is fed back to the battery pack, on the one hand, the energy consumption of the battery pack is minimized. On the other hand, it avoids excessive unbalanced discharge of the battery pack at low temperatures, and avoids the polarization of the battery due to the deviation of the electrode potential from the equilibrium electrode potential, thereby avoiding irreversible damage to the battery. A person skilled in the art should understand that different adjusting policies can be employed to drive the converter according to actual requirements and working conditions. Therefore, the durations of the charging stage and the discharging stage of each charging and discharging cycle can be set as unequal values.

In some embodiments of the present application, the inductive load is a winding of a motor and the controller is configured to control periodic on and off of a switch module in the converter, so as to enable the motor not to rotate. A person skilled in the art should understand that when the battery pack is a driving energy source of the motor, according to actual applications, the motor can be a single phase motor and can also be a multi-phase motor and the motor can be an AC motor and can also be a DC motor. Specifically, when the motor is a three-phase asynchronous motor, a three-phase synchronous motor or a DC brushless motor, the inductive load can be a stator winding of the motor. When the motor is the DC brush motor etc., the inductive load can be a rotor winding of the motor.

In some embodiments of the present application, the motor is a three-phase motor and the converter is a three-phase full-bridge circuit having a first phase bridge arm, a second phase bridge arm and a third phase bridge arm;
  where the controller is configured to:
  during the discharging stage of the charging and discharging cycle of the battery pack, close two or three switch modules, where the closed switch modules are located at different phase bridge arms, and close at least one switch module located on an upper bridge arm and at least one switch module located on a lower bridge arm; and
  during the charging stage of the charging and discharging cycle of the battery pack, disconnect the switch modules closed during the discharging stage, and close a switch module of the lower bridge arm or the upper bridge arm relative to the upper bridge arm or the lower bridge arm where the switch modules closed during the discharging stage are located.

It should be understood that the number of phases for the converter can correspond to the number of phases for the motor. For example, when the motor is a four-phase motor, the converter can be a four-phase converter.

In some embodiments of the present application, the controller is configured to:
  obtain a state parameter of the battery pack;
  obtain a temperature of the converter and a temperature of the motor;
  generate a heating stop request when the state parameter, the temperature of the converter or the temperature of the motor exceed a corresponding parameter security range, where the state parameter includes at least one of following parameters: a voltage, a temperature, a state of charge and an insulation resistance; and control all switch modules of the converter to be in an off state and disconnect the auxiliary heating mechanism from the battery pack in response to the heating stop request.

In some embodiments of the present application, the controller is configured to:
obtain state information of a vehicle where battery pack is mounted;
generate a heating stop request when the state information indicates that the vehicle is not in a heating condition, where the state information includes at least one of following parameters: a vehicle starting state, a vehicle door state, collision information, a high-voltage-up state, and an ambient temperature; and
control all switch modules of the converter to be in an off state and disconnect the auxiliary heating mechanism from the battery pack in response to the heating stop request.

In some embodiments, the auxiliary heating mechanism includes a heating film. In some other embodiments, the auxiliary heating mechanism includes a PTC heating converter.

In some embodiments of the present application, the auxiliary heating mechanism is connected in parallel to the battery pack directly and the parallel connection between the auxiliary heating mechanism and the battery pack is controlled through a switch between the auxiliary heating mechanism and the battery pack. In some other embodiments of the present application, the auxiliary heating mechanism is connected in parallel to the battery pack through a DC-DC converter and the parallel connection between the auxiliary heating mechanism and the battery pack is controlled through a switch between the auxiliary heating mechanism and the DC-DC converter. Voltages at two ends of the auxiliary heating mechanism can be adjusted through the DC-DC converter to control a heating current and a heating power of the auxiliary heating mechanism.

A third aspect of the present application provides an electric apparatus, the electric apparatus includes: a battery pack; and the battery heating system according to the second aspect of the present application. The battery pack can be used as a power source of the apparatus and can also be used as an energy storage unit of the apparatus. The above apparatus may be, but not limited to a mobile device (for example, a mobile phone or a notebook computer, etc.), an electric vehicle (for example, a full electric vehicle, a hybrid power electric vehicle, a plug-in hybrid power electric vehicle, an electric bicycle, an electric scooter, an electric golf cart, or an electric truck, etc.), an electric train, a ship, a satellite, an energy storage system, and the like. The apparatus can select a battery according to requirements for using the apparatus.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts. In the drawings.

DESCRIPTION OF EMBODIMENTS

Figure 1:
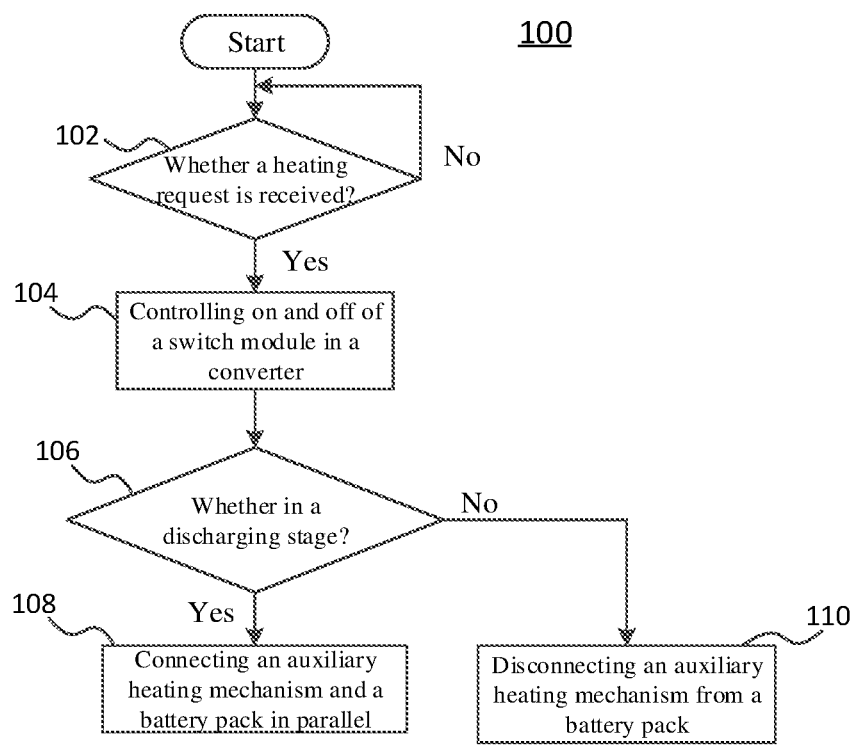
FIG. 1 exemplifies a flowchart of a method for heating a battery pack according to one embodiment of the present application.

The following describes the embodiments of the present application in more details with reference to the accompanying drawings. The following embodiments are only used for describing the technical solutions of the present application more clearly, and thus can be used as examples only, and cannot be used to limit the protection scope of the present application.

Unless otherwise defined additionally, all the technical and scientific terms used in the present application are the same as the meanings generally understood by a person skilled in the art in the present application. The terms used in the present application are merely intended for the purpose of describing specific embodiments, but not merely to limit the present application. Terms "including" and "having" in the description, claims and descriptions of the accompanying drawings in the present application, as well as their any deformations intend to cover non-exclusive inclusions.

In the descriptions of embodiments of the present application, the technical terms "first" and "second" are merely intended for a purpose of distinguishing different objects, and shall not be understood as an indication or implication of relative importance or implicit indication of the number, particular sequence or primary-secondary relationship of indicated technical features.

"Embodiments" mentioned in the present application mean that specific features, structures or features of descriptions of embodiments combined can be included in at least one embodiment of the present application. The phase appearing at each position of the description does not necessarily indicate the same embodiment and it is not an exclusively independent or alternative embodiment of other embodiments. A person skilled in the art understands implicitly and explicitly that embodiments described in the present application can be combined with other embodiments.

In the descriptions of embodiments of the present application, the term "and/or" describes only an association relationship for describing associated objects and represents that three relationships may exist. For example, A and/or B may represent the following three cases: only A exists, both A and B exist, and only B exists. In addition, a character "/" in this specification generally indicates an "or" relationship between contextually associated objects.

In the descriptions of embodiments of the present application, unless otherwise specified and defined explicitly, the term "plurality of" indicates two or more (including two). In the descriptions of embodiments of the present application, unless otherwise prescribed and defined clearly, technical terms "communicating", "connecting" and the like should be understood in a broad sense, which for example can be a mechanic connection and can also be an electrical connection; can be a direct connection and can also be an indirect connection through an intermediary, and can also be communication inside two elements or mutual acting relationship of two elements. A person of ordinary skill in the art can understand specific meanings of these terms in embodiments of the present application based on specific situations.

If steps are stated in order in the description or claims, this does not necessarily mean restriction of the embodiments or aspects to the stated sequence. On the contrary, it can be imagined that the steps are performed in a different order or in parallel with each other. Unless otherwise one step established on another step, it is absolutely necessary for the established step to be performed subsequently (however, this will become clear in an individual case). Therefore, the stated sequence may be an optional embodiment.

At present, the battery is not only used in energy storage power source systems like water power, fire power, wind power and solar energy plant, but also widely used in electric bicycles, electric motorcycles, electric vehicles and other electric vehicles, as well as military equipment and aerospace and other fields. With the continuous expansion of battery applications, the market demand is also constantly expanding.

Through studies, the applicant found that the temperature rising rate of heating with the heating film is low and the cost is high simultaneously. The temperature rising rate of heating with the PTC heater is higher than the temperature rising rate of heating with the heating film, but its heating effects greatly decrease at an extremely low temperature due to increasing viscosity of its heat conducting medium. The temperature rising rate of heating by electrical excitation is very fast and it only takes about 15 min for the battery temperature to increase from −30° C. to 10° C., but it is limited by parameters such as the battery charging and discharging current, the current flowing through an employed converting circuit and an excitation element. However, the waiting time of 15 minutes may still be too long for the user, and the user hopes to use the battery-powered electrical equipment as quickly as possible in a low temperature environment.

In order to increase the temperature rising rate, the applicant thought of combining the internal heating manner by electrical excitation with the external heating manner. On such a basis, the applicant found through deep studies that, taking a lithium battery as an example, at a same voltage, the temperature rising rate of heating with the heating film generally ranges in 0.2-0.4° C./min, the temperature rising rate of heating with the PTC heater general ranges in 0.3-0.6° C./min and the temperature rising rate of internal heating with electrical excitation is generally 2° C./min. It can be seen that the heat generating efficiency of internal heating with electrical excitation is three times or more that of the external heating (the PTC heater/heating film).

Based on above findings, in order to make the heating efficiency achieved by combining the internal heating manner by electrical excitation and the external heating manner optimal, the applicant designed a method for heating a battery pack. By connecting the external auxiliary heating mechanism and the battery in parallel during the discharging stage of the battery and disconnecting the external auxiliary heating mechanism from the battery during the charging stage of the battery, larger discharging current is generated and the external heating source is added during the discharging stage of the battery and all of energy is used for the internal heating during the charging state of the battery, so that energy is fully utilized and the heating efficiency is optimal.

FIG. 1 exemplifies a flowchart of a method 100 for heating a battery pack according to one embodiment of the present application. As shown in FIG. 1, in step 102, detecting whether a heating request is received. If the heating request is received, step 104 is performed; otherwise, step 102 is repeated. The heating request can be generated according to parameters such as the voltage, the temperature and/or the state of charge of the battery pack. For example, when the voltage is greater than the preset voltage threshold, the state of charge (SOC) is greater than the preset SOC threshold and the temperature is lower than the preset temperature threshold, the heating request is generated.

In response to the heating request, in step 104, controlling on and off of a switch module in the converter connected between a battery pack and an inductive load, so as to control discharging and charging between the battery pack and the inductive load.

In response to a control command for on and off of the switch module in the converter, in step 106, judging whether the battery pack is in a discharging stage. If the battery pack is in a discharging stage, connecting an auxiliary heating mechanism and the battery pack in parallel in step 108. If the battery pack is not in a discharging stage, disconnecting the auxiliary heating mechanism from the battery pack in step 110.

In the embodiment of the present application, the internal heating of the battery and the external auxiliary heating mechanism are combined to further increase the heating speed and shorten the heating time. Specifically, in the charging and discharging process of the battery, a charging current and a discharging current flows through internal resistor of the battery to generate heat for heating the inside of the battery. During the discharging stage of the battery, the battery is heated outside by connecting the battery to the auxiliary heating mechanism in parallel. During the charging stage of the battery, the auxiliary heating mechanism is not used for heating the battery. Since the current flowing through the converter and the inductive load is limited, thus during the discharging stage of the battery, the battery is connected in parallel to the auxiliary heating mechanism. The solution not only adds an external heating source, but also increases a discharging current flowing through the internal resistor, thereby increasing a heating efficiency. In addition, during the charging stage of the battery, energy of the charging is from energy stored by the inductive load during the discharging stage. Since a heat generating efficiency of the internal resistor of the battery under a same voltage is greater than a heat generating efficiency of the external auxiliary heating mechanism, thus the auxiliary heating mechanism is disconnected during the charging stage of the battery, so that of all energy of the inductive load is used for charging, so that the heating efficiency is optimal.

In some embodiments of the present application, it is necessary to determine whether a battery heating condition is satisfied before generating the heating request. Specifically, it is necessary to confirm a present working state of a motor of a vehicle, whether a fault occurs to a battery, whether a fault occurs to a three-phase AC motor, whether a fault occurs to a motor controller and whether a fault occurs to a heat conducting loop. If the present working state of the motor is in a non-driving state and no fault occurs to the battery, the three-phase AC motor, the motor controller and the heat conducting loop, it indicates that the battery can be heated at this time. If the present working state of the motor is in a driving state or a fault occurs to any one of the battery, the three-phase AC motor, the motor controller and the heat conducting loop, it indicates that the battery may not be heated at this time.

In some embodiments of the present application, by obtaining gear information and rotating speed information of the motor and according to the gear information and the rotating speed information of the motor, the present working state of the motor is obtained, such that when judging whether the battery pack satisfies the heating condition according to the working state of the motor afterward, it can be judged according to the gear information and the rotating speed information of the motor. When any one condition is not satisfied, the battery pack cannot be heated to prevent the battery pack from being heated when the vehicle is in a normal traveling state, thus further preventing the performance of the vehicle from being affected.

Figure 2:
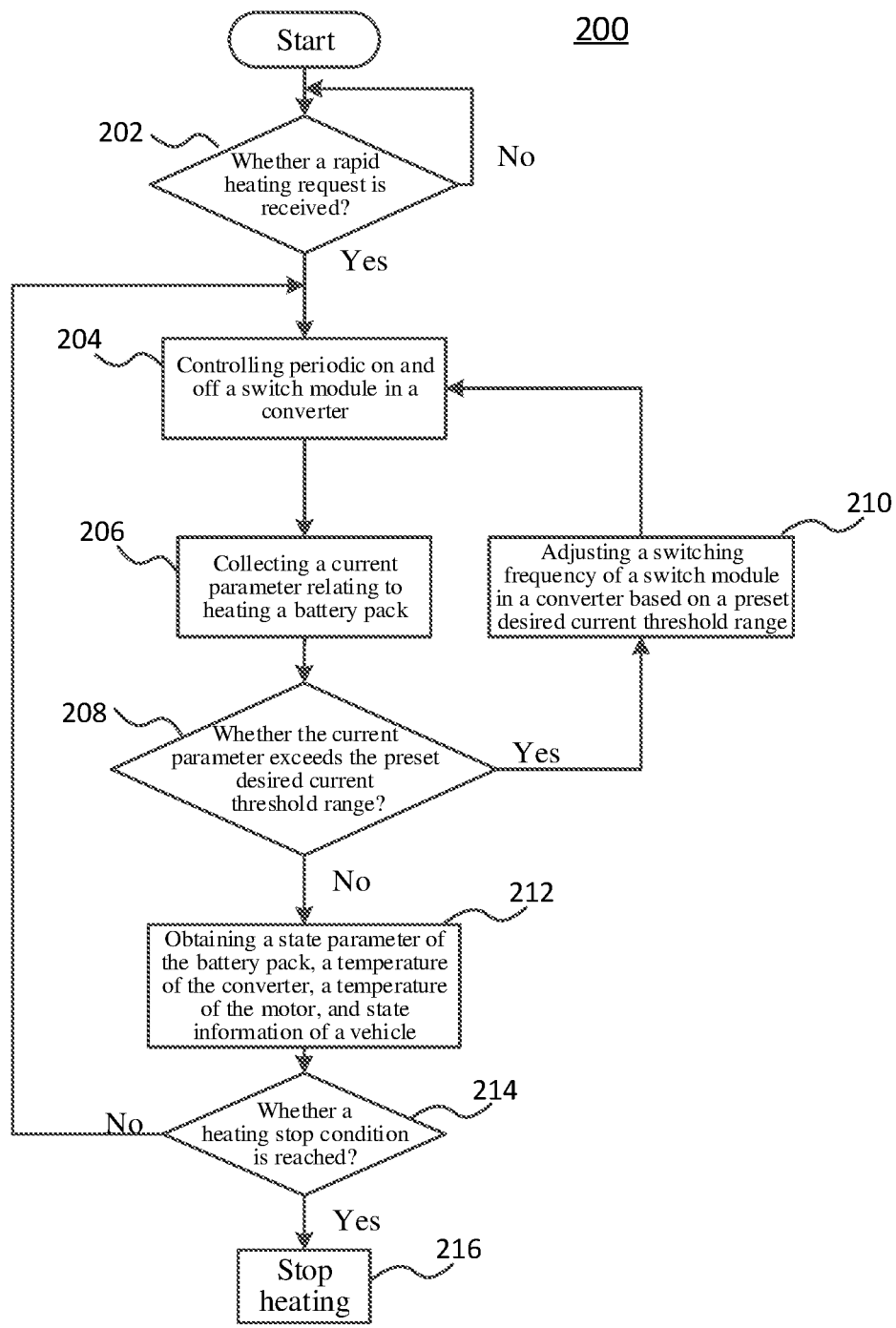
FIG. 2 exemplifies a flowchart of a method for heating a battery pack according to one embodiment of the present application.

FIG. 2 exemplifies a flowchart of a method 200 for heating a battery pack according to one embodiment of the present application. As shown in FIG. 2, in step 202, detecting whether a heating request is received. If the heating request is received, step 204 is performed; otherwise, step 202 is repeated. As described above, the heating request can be generated according to parameters such as the voltage, the temperature and/or the state of charge of the battery pack. For example, when the voltage is greater than the preset voltage threshold, the SOC is greater than the preset SOC threshold and the temperature is lower than SOC is greater threshold, the heating request is generated.

In response to the heating request, in step 204, controlling a switch module in the converter connected between a battery pack and an inductive load to turn on and off periodically, so as to control periodic discharging and charging between the battery pack and the inductive load.

Subsequently, in step 206, collecting a current parameter relating to heating the battery pack.

In step 208, judging whether the collected current parameter relating to heating the battery pack exceeds a preset desired current threshold range. If the collected current parameter exceeds the preset desired current threshold range, adjusting durations of the charging stage and the discharging stage of a charging and discharging cycle of the battery pack based on the preset desired current threshold range. Specifically, the durations of the charging stage and the discharging stage are adjusted by adjusting the switching frequency of the switch module in the converter in step 210.

In some embodiments of the present application, the inductive load is a winding of a motor and the switch module in the converter is controlled to be turned on or off periodically in step 204 to cause the motor not to rotate. A person skilled in the art should understand that when the battery pack is a driving energy source of the motor, according to actual applications, the motor can be a single phase motor or a multi-phase motor, and the motor can be an AC motor or a DC motor. Specifically, when the motor is a three-phase AC asynchronous motor, a three-phase AC synchronous motor or a DC brushless motor, the inductive load can be a stator winding of the motor. When the motor is the DC brush motor etc., the inductive load can be a rotor winding of the motor.

In some embodiments of the present application, the motor is a three-phase AC motor and the converter is a three-phase full-bridge circuit having a first phase bridge arm, a second phase bridge arm and a third phase bridge arm.

Where during the discharging stage of the charging and discharging cycle of the battery pack, closing two or three switch modules, the closed switch modules are located at different phase bridge arms, and closing at least one switch module located on an upper bridge arm and at least one switch module located on a lower bridge arm.

During the charging stage of the charging and discharging cycle of the battery pack, disconnecting the switch modules closed during the discharging stage, and closing a switch module of the lower bridge arm or the upper bridge arm relative to the upper bridge arm or the lower bridge arm where the switch modules closed during the discharging stage are located.

In the embodiments with the motor as the three-phase AC motor, a preset direct axis current id and a preset quadrature axis current iq that drive a three-phase AC motor can be obtained; where the preset direct axis current id can be set as a desired DC bus current of a converter and the preset quadrature axis current iq can be set to enable a torque value output by the three-phase AC motor in a target range. Specifically, the direction of the preset direct axis current id can change periodically in a heating process and the preset quadrature axis current iq can enable the torque value output by the three-phase AC motor to be smaller, i.e. the torque cannot enable the vehicle to move and will not cause a damage to parts of a transmission mechanism of the vehicle. An inter-gear preload of the transmission mechanism of the vehicle is completed only by providing a very small output torque. The preset quadrature axis current iq can be obtained through multiple experiments.

In the embodiment of the three-phase AC motor, after obtaining the preset direct axis current id and the preset quadrature axis current iq, on and off states of the switch module in the three-phase converter can be controlled, i.e. controlling on and off durations of the switch module in the three-phase converter, such that the internal resistor of the battery pack generates heat according to the preset direct axis current id and in the heating process, and the three-phase converter can be controlled according to the preset direct axis current id and the preset quadrature axis current iq to adjust the phase current of the three-phase AC motor.

Figure 6:
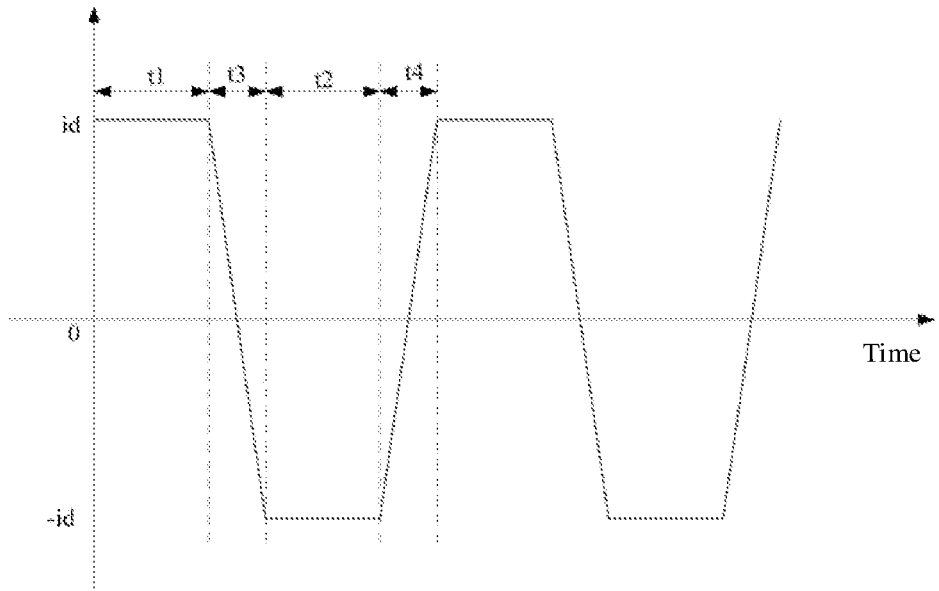
FIG. 6 exemplifies a schematic diagram of waveform of a preset direct axis current in a method for heating a battery pack according to one embodiment of the present application.

Specifically, as shown in FIG. 6, the heating process includes a plurality of charging and discharging cycles and each charging and discharging cycle includes a preset discharging duration t1, a preset charging duration t2 and two preset switch durations t3 and t4. The preset direct axis current id is positive in a direction and has an invariable amplitude during the preset discharging duration t1, the preset direct axis current id is negative in a direction and has an invariable amplitude during the preset charging duration t2, the preset direct axis current id changes from positive to negative in a direction and has a variable amplitude during the first preset switch duration t3, and the preset direct axis current id changes from negative to positive in a direction and has a variable amplitude during the second preset switch duration t4. Where the preset discharging duration t1 is equal to the preset charging duration t2, the first preset switch duration t3 is equal to the second preset switch duration t4 and the preset heating duration is greater than the preset switch duration. By setting the durations of the charging stage and the discharging stage of each charging and discharging cycle to be equal to each other, all energy stored in the inductive load during the discharging stage is made to be fed back to the battery pack during the charging stage. In such an embodiment, all energy in the inductive load is fed back to the battery pack, on one hand, the energy consumption of the battery pack is minimized, and on the other hand, it avoids excessive unbalanced discharge of the battery pack at low temperatures, and avoids the polarization of the battery due to the deviation of the electrode potential from the equilibrium electrode potential, thereby avoiding irreversible damage to the battery.

If it is judged in step 208 that the collected current parameter does not exceed the preset desired current threshold range, the switching frequency of the switching module of the converter is not adjusted and step 212 proceeds.

In step 212, obtaining a state parameter of a battery pack, a temperature of a converter, and a temperature of a motor are obtained and state information of a vehicle, where the state parameter of the battery pack includes at least one of following parameters: a voltage, a temperature, a state of charge and an insulation resistance; and the state information of the vehicle includes at least one of following information: a vehicle starting state, a vehicle door state, collision information, a high-voltage-up state, and an ambient temperature.

Then in step 214, judging whether a heating stop condition is reached according to the obtained state parameter of the battery pack, the temperature of the converter, the temperature of the motor and the state information of the vehicle. Specifically, judging whether the state parameter of the battery pack, the temperature of the converter or the temperature of the motor exceeds a corresponding parameter security range and judging whether the state information of the vehicle indicates that the vehicle is not in a heating condition.

If the heating stop condition is reached, a heating stop request is generated to stop heating in step 216. Specifically controlling all switch modules of the converter to be in an off state and disconnecting the auxiliary heating mechanism from the battery pack. If the heating stop condition is not reached, it returns to step 204.

A person skilled in the art should understand that steps 206-214 can be performed in a sequence that is different from the described sequence in a case of not impacting subsequent steps, and these steps may also be performed simultaneously.

Figure 3:
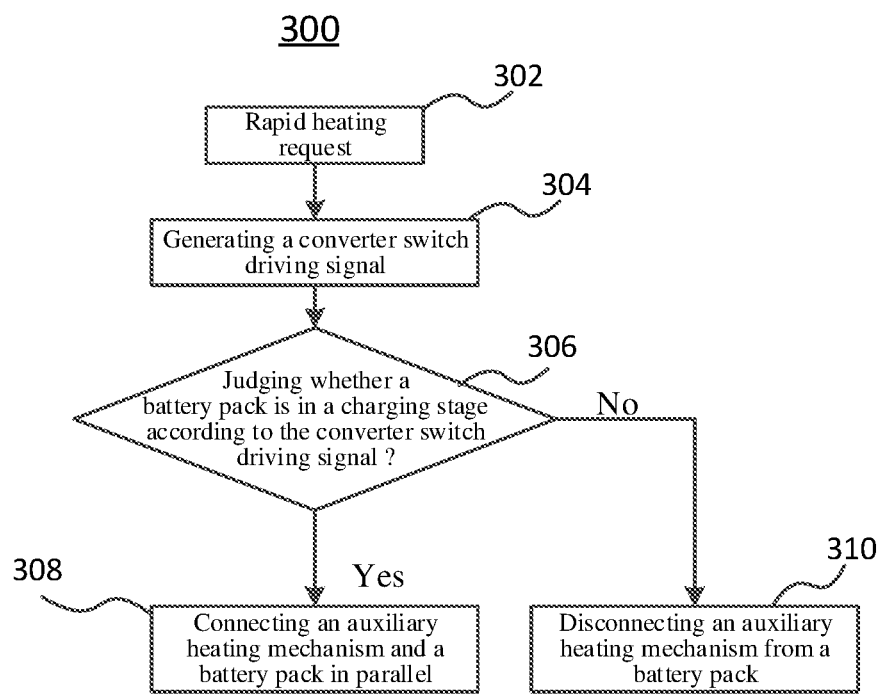
FIG. 3 exemplifies a flowchart of a method for controlling a connection between an auxiliary heating mechanism and a battery pack according to one embodiment of the present application.

FIG. 3 exemplifies a flowchart of a method 300 for controlling a connection between an auxiliary heating mechanism and a battery pack according to one embodiment of the present application. As shown in FIG. 3, in step 302, receiving a heating request. In response to the heating request, in step 304, generating a converter switch driving signal. Then, in step 306, judging whether a battery pack is in a discharging stage according to the converter switch driving signal.

When the battery pack is in a discharging stage, connecting an auxiliary heating mechanism and the battery pack in parallel in step 310. When the battery pack is not in a discharging stage, disconnecting the auxiliary heating mechanism from the battery pack in step 312. In some embodiments of the present application, referring to the waveform of a preset direct axis current id exemplified in FIG. 6, during the preset discharging duration t1, the auxiliary heating mechanism is connected in parallel to the battery pack and during the preset charging duration t2, the auxiliary heating mechanism is disconnected from the battery pack.

Figure 4:
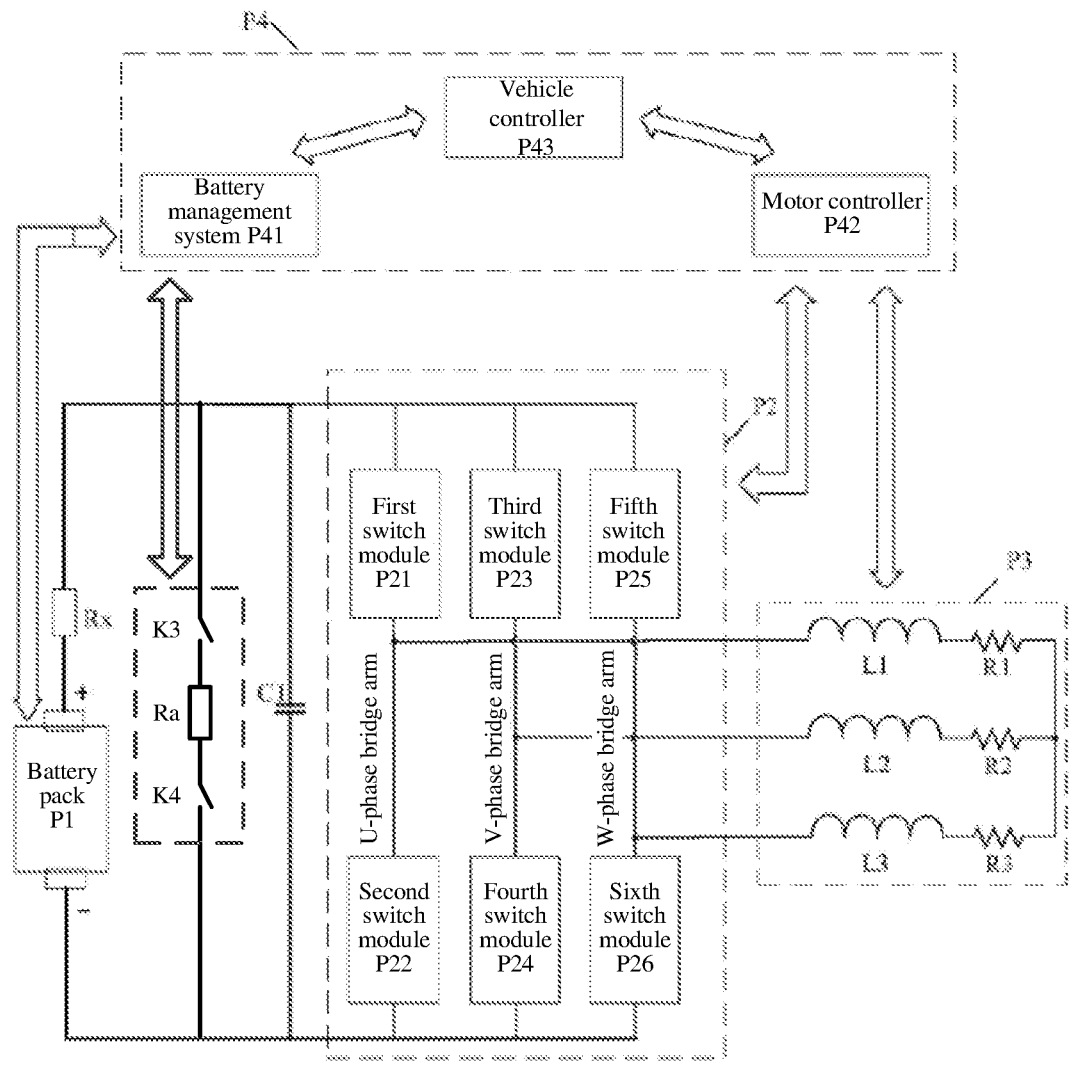
FIG. 4 exemplifies a structural diagram of a battery heating system according to one embodiment of the present application.

FIG. 4 exemplifies a structural diagram of a battery heating system according to one embodiment of the present application. The battery heating system includes a converter P2, where a direct current end of the converter P2 is connected to a positive electrode and a negative electrode of a battery pack P1; an inductive load L1, L2 and L3, connected to an alternating current end of the converter P2; an auxiliary heating mechanism Ra connected to the battery pack P1 in parallel; and a controller P4 respectively connected to the converter P2 and a winding L1, L2 and L3 of a motor, where the controller P4 is configured to control on and off of a switch module in the converter P2 periodically in response to a heating request, so as to control discharging and charging between the battery pack P1 and the winding L1, L2 and L3 of the motor periodically; connect the auxiliary heating mechanism Ra in parallel to the battery pack P1 during a discharging stage of the battery pack P1; and disconnect the auxiliary heating mechanism Ra from the battery pack P1 during a charging stage of the battery pack P1. The auxiliary heating mechanism Ra in the embodiment can be a heating film and can also be a PTC heater. During the discharging stage of the battery pack P1, the controller P4 close switches K3 and K4 and connect the auxiliary heating mechanism Ra in parallel to the battery pack P1; and during the charging stage of the battery pack P1, the controller P4 disconnect switches K3 and/or K4 and disconnect the heating film from the battery pack P1. In the embodiment, two switches K3 and K4 are exemplified. It should be understood that the two switches can be replaced with one switch. In one embodiment of the present application, referring to the waveform of a preset direct axis current id shown in FIG. 6, when started from the first preset switch duration t3, switches K3 and K4 are closed; and when started from the second preset switch duration t4, switches K3 and/or K4 are disconnected.

In the embodiment of FIG. 4, the motor P3 is a three-phase AC motor and the converter P2 is a three-phase full-bridge circuit. It should be understood that FIG. 4 is only an exemplary embodiment. According to the actual application requirements, the motor P3 can be a single-phase motor, a two-phase motor, a four-phase motor or the motor of more phases. Accordingly, the converter P2 can be a single-phase circuit, a two-phase circuit, a four-circuit phase or a circuit of more phases.

In some embodiments of the present application, the controller P4 includes a battery management system P41, a vehicle controller P43 and a motor controller P42. The battery management system P41 is configured to obtain a state parameter of the battery pack P1. If the state parameter of the battery pack P1 satisfies a preset heating condition, a heating request is transmitted to the vehicle controller P43. If the obtained state parameter of the battery pack P1 upon heating the battery pack P1 is abnormal, a heating stop request is transmitted to the vehicle controller P43. In some embodiments of the present application, the state parameter of the battery pack P1 includes at least one of following parameters: a voltage, a temperature, a SOC and an insulation resistance. It should be understood that the state parameter of the battery pack P1 can be other parameter representing the state of the battery pack P1, including but not limited to a current, a state of health (SOH), a discharging power and internal resistance etc. of the battery pack P1.

In some embodiments of the present application, if the battery management system P41 judges that the temperature of the battery pack P1 is greater than or equal to a desired temperature threshold, it indicates that the temperature of the battery pack is normal, thus resulting in no need of heating the battery pack is reported to the vehicle controller P43 for the vehicle controller P43 to issue a power-on instruction to indicate high-voltage up of the battery management system P41 to the battery management system P41 according to the information.

In some embodiments of the present application, if the state parameter of the battery pack P1 includes a state of charge of the battery pack P1, the preset heating condition includes a state of charge of the battery pack P1 that is greater than a state of charge threshold. The state of charge threshold represents the state of charge predicted to be consumed for the heating. Wherein the state of charge threshold can be set according to a working scene and a working requirement, including, but not limited to a desired heating temperature, a present temperature and a self-heating performance of the battery pack etc. If the state of charge of the battery pack P1 is higher than the state of charge threshold, it means that the present electric quantity of the battery pack P1 is sufficient to provide electric quantity required for entering a heating mode. If the state of charge of the battery pack P1 is smaller than the state of charge threshold, it means failure of providing sufficient electric quantity for the heating.

The motor controller P42 is configured to monitor whether the motor P3 is in a non-working state and transmit working state information of the motor P3 to the vehicle controller P43; and control on and off of a switch module in the converter P2 periodically in response to a control signal to heat the battery pack P1.

In some embodiments of the present application, the motor P3 is in a non-working state, representing that the motor P3 is presently not in a working process of converting electrical energy into mechanical energy. In some embodiments, the motor P3 is in a non-working state, that is, the motor P3 is an off state. In some embodiments, if the motor controller P42 judges that the motor P3 is in a working state, information about that the motor P3 is in a working state is reported to the vehicle controller P43 to enable the vehicle controller P43 to stop controlling the battery pack heating system from heating the battery pack P1.

The vehicle controller P43 is configured to monitor state information of a vehicle where the battery pack P1 is mounted, and configured to respond to the heating request, the working state information of the motor and the heating stop request, and transmit a control signal to the motor controller P42.

In some embodiments of the present application, before controlling the battery pack heating system, it is also necessary to confirm whether each control device of the control system P4 of the battery pack heating system is in a normal working state. In the process, the vehicle controller P43 is also configured to judge whether the state of the vehicle controller P43, the state of the battery management system P41 and the state of the motor controller P42 are in a normal working state if a vehicle start signal is detected.

In some embodiments, the switch modules P21, P22, P23, P24, P25 and P26 in the converter P2 are turned on and off according to a driving signal generated by the motor controller P42. In particular, two or three switch modules of these switch modules are closed during the discharging stage of the charging and discharging cycle of the battery pack P1, the closed switch modules are located at different phase bridge arms, and at least one switch module located on an upper bridge arm and at least one switch module located on a lower bridge arm are closed. In other words, it is possible to close P21, P24, P26, to close P22, P23, P26, to close P22, P24, P25, to close P21, P23, P26, to close P21, P24, P25, or to close P22, P23, P25. During the charging stage of the charging and discharging cycle of the battery pack P1, the switch modules closed during the discharging stage are disconnected, and a switch module of the lower bridge arm or the upper bridge arm relative to the upper bridge arm or the lower bridge arm where the switch modules closed during the discharging stage are located is closed.

Each switch module in the converter P2 can include one or more of an insulated gate bipolar transistor (IGBT) chip, an IGBT module, a metal-oxide-semiconductor field-effect transistor (MOSFET) and other power switch devices. The manners for combining and connecting each IGBT device and MOSFET device etc. in the switch module are not limited herein. The materials of the power switch device are not limited as well. For example, the power switch device made of silicon carbide (i.e. SiC) or other materials can be employed. What is noteworthy is that the power switch device has a diode, such as a diode against a parallel connection. The diode can specifically be a parasitic diode or an especially designed diode. The types for the materials of the diode are not limited as well. For example, the diode made of silicon (i.e. Si), silicon carbide, or other materials can be employed.

Figure 5:
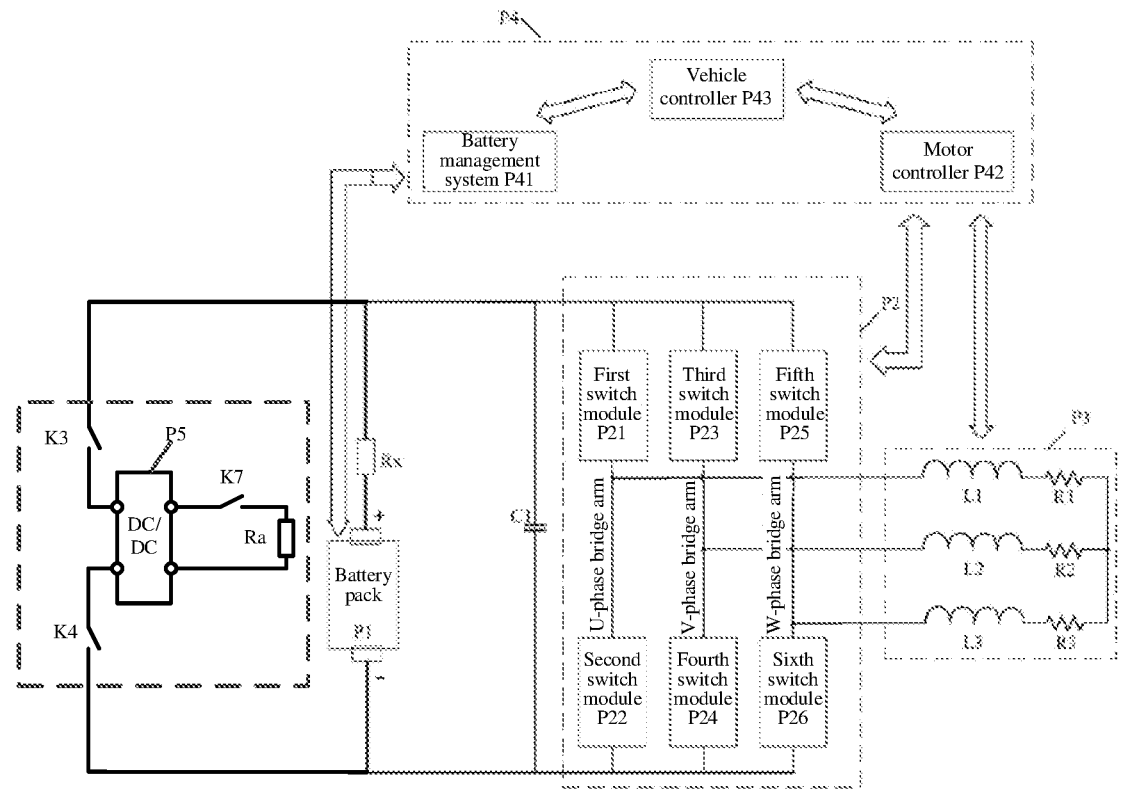
FIG. 5 exemplifies a structural diagram of a battery pack heating system according to another embodiment of the present application.

FIG. 5 exemplifies a structural diagram of a battery heating system according to another one embodiment of the present application. In FIG. 5, the auxiliary heating mechanism can be a PTC heater and can also be a heating film. In the embodiment of the PTC heater, the PTC heater is connected in parallel to the battery pack P1 through the DC-DC converter P5. In some embodiments, switches K3 and K4 are kept at a constant off state. During the discharging stage of the battery pack P1, the controller P4 closes the switch K7 and connect the PTC heater in parallel to the battery pack P1; and during the charging stage of the battery pack P1, the controller P4 disconnects the switch K7 and disconnect the PTC heater from the battery pack P1. Voltages at two ends of the PTC heater can be adjusted through the DC-DC converter P5 to control a heating current and a heating power of the PTC heater. By increasing the heating current, the heating power can be improved such that the heating power of the PTC heater is not restricted by voltages at two ends of the battery pack P1.

In embodiments shown in FIG. 4 and FIG. 5, by controlling on and off of the switch modules P21, P22, P23, P24, P25, P26, especially on and off durations and the switching frequency, the motor controller P42 is made to control the three-phase converter P2 to adjust the phase current of the three-phase AC motor P3 according to the preset direct axis current id and the preset quadrature axis current iq. In the process for the motor controller P42 to control the three-phase converter P2 to adjust the phase current of the three-phase AC motor P3, the direction of the preset direct axis current id changes periodically, as described with reference to FIG. 6. In the embodiment of the present application, in the process for the motor controller P42 to control the three-phase converter P2 to adjust the phase current of the three-phase AC motor P3, the preset direct axis current id is controlled to have an invariable current amplitude and a direction changing alternatively between the positive direction and the negative direction during the preset discharging duration t1 and the preset charging duration t2. In this way, the number of the switching times of the power switch device on the upper and the lower bridge arm of the same phase in the three-phase converter P2 are uniform, and the device life is balanced.

In addition, in the process for the motor controller P42 to control the three-phase converter P2 to adjust the phase current of the three-phase AC motor P3, the preset quadrature axis current iq is a quadrature axis current having a constant amplitude and the amplitude is obtained through lots of experiments and can make the motor axis output an electromagnetic torque with a smaller torque value. Moreover, the electromagnetic torque cannot make the vehicle move and will not cause any damage to parts of the transmission mechanism of the vehicle. Only by providing a very small output torque, a gear clearance meshing or preload of the transmission mechanism of the vehicle can be completed.

In some embodiments of the present application, when the controller P4 controls the three-phase converter P2 according to the preset direct axis current id and the preset quadrature axis current iq to adjust the phase current of the three-phase AC motor P3, it is necessary for the motor controller P42 to obtain the present three-phase current value of the three-phase AC motor P3 and motor rotor position angle information before the battery pack is heated, and convert the present three-phase current value into the direct axis current and the quadrature axis current according to the motor rotor position angle information, such that in the heating process, according to the direct axis current, the quadrature axis current, the preset direct axis current and the preset quadrature axis current, the three-phase converter P2 is controlled to adjust the phase current of the three-phase AC motor P3.

Figure 7:
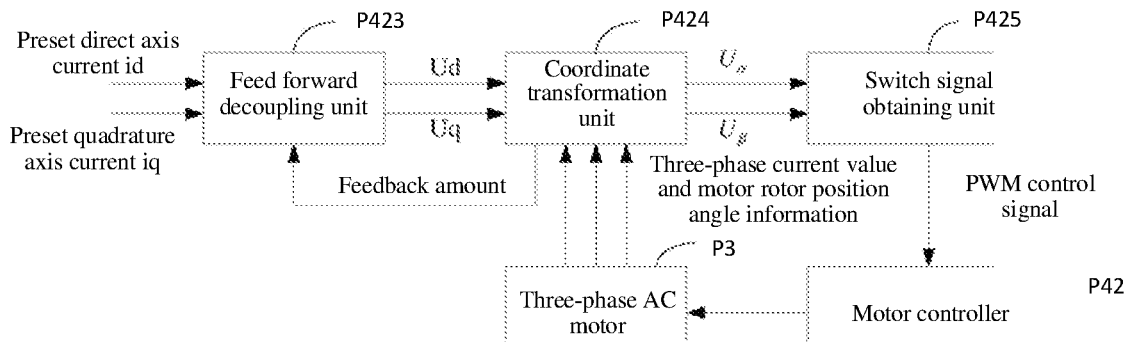
FIG. 7 exemplifies a structural drawing of a control module of a battery pack heating system according to one embodiment of the present application.

In one embodiment of the present application, as shown in FIG. 7, the controller P4 further includes a feed forward decoupling unit P423, a coordinate transformation unit P424 and a switch signal obtaining unit P425, where the feed forward decoupling unit P423 is connected to the coordinate transformation unit P424, the coordinate transformation unit P424 is connected to the switch signal obtaining unit P425 and the three-phase AC motor P3, the switch signal obtaining unit P425 is connected to the motor controller P42, and the motor controller P42 is connected to the three-phase AC motor P3. Specifically, after the controller P4 obtains the direct axis current and the quadrature axis current, the direct axis current and the quadrature axis current are respectively compared with the preset direct axis current id and the preset quadrature axis current iq to enable adjustment of the direct axis current and the quadrature axis current according to the preset direct axis current id and the preset quadrature axis current iq, such that the three-phase converter P2 is controlled according to the preset direct axis current id and the preset quadrature axis current iq. After the direct axis current and the quadrature axis current are adjusted according to the preset direct axis current id and the preset quadrature axis current iq, the adjusting result is output to the feed forward decoupling unit P423, and the feed forward decoupling unit P423 obtains the direct axis voltage Ud and the quadrature axis voltage Uq after decoupling the adjusting result. The coordinate transformation unit P424 performs coordinate transformation on the direct axis voltage Ud and the quadrature axis voltage Uq to obtain a first voltage Uα and a second voltage Uβ. The switch signal obtaining unit P425 obtains a switch signal according to the first voltage Uα and the second voltage Uβ and the motor controller P42 controls the three-phase converter P2 to adjust the phase current of the three-phase AC motor P3 according to the switch signal. In such an implementation, by adjusting the obtained direct axis current and the quadrature axis current according to the preset direct axis current id and the preset quadrature axis current iq, a corresponding adjusting result is obtained and after making a series of changes to the adjusting result, the switch signal of the three-phase converter P2 is obtained, such that the motor controller P42 controls the three-phase converter P2 to adjust the phase current of the three-phase AC motor P3 according to the switch signal, thereby realizing closed-loop control over the three-phase AC motor and adjustment of the heating power, enhancing effectiveness in the battery heating process and reduce consumption of parts like the motor.

Figure 8:
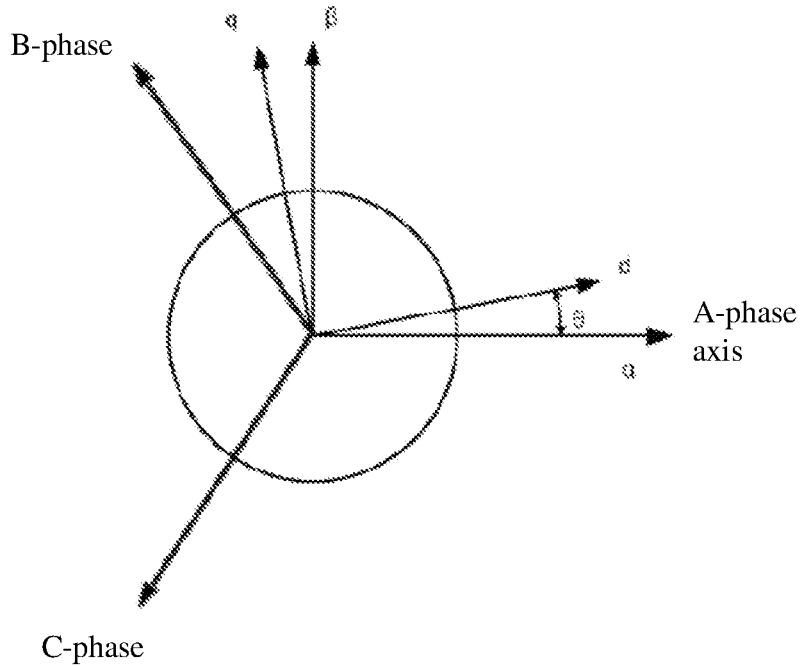
FIG. 8 exemplifies a schematic diagram of coordinate transformation in a battery pack heating system according to one embodiment of the present application.

In one embodiment of the present application, the specific process for the controller P4 to obtain the direct axis current and the quadrature axis current according to the motor rotor position angle information and the present three-phase current value of the three-phase AC motor P3 involves:

before the battery is heated, after the controller P4 obtains the present three-phase current value of the three-phase AC motor P3 and the motor rotor position angle information the coordinate transformation unit P424 transforms the present three-phase current value from a natural coordinate system to a static coordinate system and transform the present three-phase AC value under the static coordinate system into the direct axis current and the quadrature axis current under the synchronous rotating coordinate system according to the motor rotor position angle information (as shown in FIG. 8).

In such an embodiment, by transforming the present three-phase current value from the natural coordinate system to the static coordinate system and transforming the present three-phase AC value under the static coordinate system into the direct axis current and the quadrature axis current under the synchronous rotating coordinate system according to the motor rotor position angle information, such that the accuracy in the adjusting process can be improved based on the standards under the same coordinate system when the controller P4 controls the three-phase converter P2 to adjust the phase current of the three-phase AC motor P3 according to the obtained direct axis current and quadrature axis current.

As shown in FIG. 7, after obtaining the present three-phase current value and the motor rotor position angle information of the three-phase AC motor P3, the coordinate transformation unit P424 transforms a variable under the natural coordinate system ABC into a variable under the static coordinate system α-β through Clark's transformation and afterward transforms the variable under the static coordinate system α-β into a variable under the synchronous rotating coordinate system d-q through Parks transformation; and under the condition of adhering to invariable amplitude in the entire coordinate transformation, a transformation coefficient ⅔ is added before a transformation matrix.

Specifically, when transforming the variable under the natural coordinate system ABC into the variable under the static coordinate system α-β, the coordinate transformation unit P424 transforms the variable under the natural coordinate system ABC according to the transformation matrix $$T_{3s/2s} = \frac{2}{3}\begin{bmatrix} 1 & -0.5 & -0.5 \\ 0 & \frac{\sqrt{3}}{2} & -\frac{\sqrt{3}}{2} \\ \frac{\sqrt{2}}{2} & \frac{\sqrt{2}}{2} & \frac{\sqrt{2}}{2} \end{bmatrix}.$$

When transforming the variable under the static coordinate system α-β into the variable under the synchronous rotating coordinate system d-q, the coordinate transformation unit P424 transforms the variable under the static coordinate system α-β according to the transformation matrix $$T_{2s/2r} = \begin{bmatrix} \cos\theta & \sin\theta \\ -\sin\theta & \cos\theta \end{bmatrix}.$$

Then, the two transformations are multiplied so as to obtain the transformation matrix $$T_{3s/2r} = \frac{2}{3}\begin{bmatrix} \cos\theta & -\sin\theta & 0.5 \\ \cos\left(\theta - \frac{2}{3}\pi\right) & -\sin\left(\theta - \frac{2}{3}\pi\right) & 0.5 \\ \cos\left(\theta + \frac{2}{3}\pi\right) & -\sin\left(\theta + \frac{2}{3}\pi\right) & 0.5 \end{bmatrix}$$

from the natural coordinate system ABC to the synchronous rotating coordinate system d-q. In the formula, θ is a dihedral angle (motor rotor position angle information) between a rotor direct axis of the three-phase AC motor P3 and an A-phase winding of the three-phase AC motor P3. After passing through the transformation matrix T3s/2r, the three-phase current under the natural coordinate system ABC can be transformed into a quadrature axis current and a direct axis current, where the direct axis current is a magnetizing current and the quadrature axis current is a torque current, that is, only the quadrature axis current relates to the output torque at the motor axis end. Therefore, in the heating process, output of the torque at the motor axis end can be controlled by controlling the quadrature axis current.

It can be seen from the output torque calculating formula $$T_e = \frac{3}{2} p \cdot i_q [\varphi_f + (L_d - L_q) \cdot i_d]$$

at the motor axis end of the three-phase AC motor P3 that there is no torque output at the motor axis end when the quadrature axis current iq is equal to zero. However, since if the quadrature axis current is controlled to be zero in an actual use, i.e. not generating an electromagnetic torque of the motor, the zero position of the motor must be accurately obtained. However, restricted by factors such as the accuracy of the zero position calibrating method of the motor and the accuracy of signal collection, if the zero position of the motor is inaccurate, the control algorithm cannot control the quadrature axis current as zero constantly, thus causing the quadrature axis current value to fluctuate around zero. As a result, the vehicle generates dithering and the dithering strength will also be different in a different working condition. If there is a driver and passengers on the vehicle at this time, poor driving and riding experience will be generated. In order to remove the drawback, in the present application, the amplitude of the preset quadrature axis current iq is controlled in real time to a constant proper value. The value cannot make the vehicle have the trend and feelings of moving or vibrating and it will not cause any potential damage to the transmission mechanism of the vehicle. Only by enabling the motor axis to output a torque with a smaller amplitude, the mechanical strength of the transmission mechanism is in an acceptable range. In this way, an effect similar to the pre-tightening force will be generated to remove meshing gap between the transmission mechanism. In this way, comfortable feelings of the driver and passengers can be ensured and the heating of the battery pack can also be ensured when the vehicle is normal, where Te represents an output torque at the motor axis end, p represents the number of motor electrode pairs, φ$_f$ represents a magnetic linkage of the motor's permanent magnet, Ld represents a direct axis inductance, Lq represents a quadrature axis inductance, id represents a direct axis current and iq represents a quadrature axis current.

In addition, in order to prevent the problem of uneven device life caused by the uneven switching times of power switches on the same phase bridge arm of the three-phase converter P2, the battery heating system provided by embodiments of the present application provides a preset direct axis current with periodic changes in direction when adjusting the phase current of the three-phase AC motor P3. For the preset direct axis current, in one cycle, the current direction in the first half cycle is positive, and the current direction in the second half cycle is negative, so that the switching times of the power switch device on the upper and lower arms of the same phase in the three-phase converter P2 are uniform, and the device life is balanced.

Further, after performing coordinate transformation over the collected variable to obtain the direct axis current and the quadrature axis current, the direct axis current and the quadrature axis current are respectively compared with the preset direct axis current iq and the preset quadrature axis current id and the comparison result is fed back to the feed forward decoupling unit P423. The feed forward decoupling unit P423 decouples the variable completely in the manner of feed forward compensation. After decoupling is completed, the obtained direct axis voltage Ud and the quadrature axis voltage Uq are transmitted again to the coordinate transformation P424. Through a reverse Park's transformation matrix $$T_{2r/2s} = \begin{bmatrix} \cos\theta & -\sin\theta \\ \sin\theta & \cos\theta \end{bmatrix},$$

the voltage variables Uα and Uβ in the static coordinate system are obtained. Subsequently, Uα and Uβ are transmitted to the switch signal obtaining unit P424. The switch signal obtaining unit P424 obtains a six-path switch signal that controls the three-phase converter P2 through a space vector pulse width modulation (SVPWM) algorithm. The motor controller P42 controls the power switch device in the three-phase converter P2 through the six-path switch signal for the switch to act, thereby controlling the magnitude of the three-phase current flowing through the three-phase AC motor P3.

In the embodiment of the present application, during the heating process of the battery pack P1, since any one device will be damaged at an excessively high temperature, thus it is necessary for real-time monitoring over the temperature of the power device in the three-phase AC motor P3 and the three-phase converter P2. If the temperature of any one of the three-phase converter P2 or the three-phase AC motor P3 is detected to exceed a temperature threshold, the current amplitude of the preset direct axis current id is reduced or the preset direct axis current id is set to zero. Therefore, the phase current flowing through the three-phase winding of the three-phase AC motor P3 will also be reduced or set to zero. In this way, the heating efficiency of the motor P3 is reduced, thereby reducing the temperature of the power unit in the three-phase converter P2 and the temperature of the three-phase winding in the three-phase AC motor P3. Thus, no damage will be caused to vehicle parts while the heating effects are ensured.

In some embodiments of the present application, the battery management system P41 monitors the temperature of the battery pack P1 on a real time. If the temperature of the battery pack P1 reaches a specified heating temperature, heating of the power battery is stopped. At this time, the direct axis current needs to be reduced. Through such a setting, the battery pack P1 is effectively prevented from overheating and the battery pack P1 is prevented from being damaged, and the service life of the battery pack P1 is improved.

Figure 9:
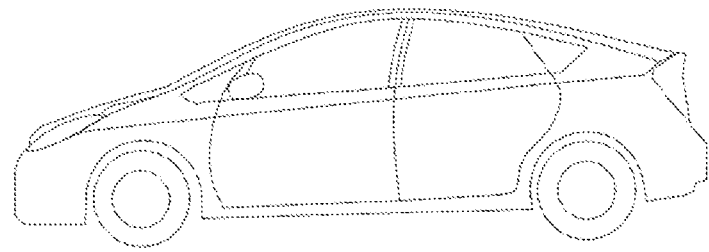
FIG. 9 exemplifies a schematic diagram of an electric apparatus according to one embodiment of the present application.

FIG. 9 shows an apparatus as an example. The apparatus is a full electric vehicle, a hybrid power electric vehicle, a plug-in hybrid power electric vehicle, or the like. As another example, the apparatus may be a mobile phone, a tablet computer, a notebook computer, or the like. As another example, the apparatus may be an electric train, a ship, a satellite, an energy storage system, and the like.

Although the present application has been described with reference to some embodiments, various improvements can be made thereto and equivalents can be used for replacement of members therein without departing from the scope of the present application. In particular, as long as a structural conflict does not exist, each technical feature mentioned in each embodiment can be combined in any manner. The present application is not restricted to particular embodiments disclosed herein, but to include all technical solutions falling in the scope of the claims.

What is claimed is:

1. A method for heating a battery pack, the battery pack connecting to an inductive load via a converter, the battery pack comprises an internal resistor and the method comprising:
controlling on and off of a switch module in the converter when receiving a heating request, so as to control discharging and charging between the battery pack and the inductive load;
connecting the battery pack and an auxiliary heating mechanism in parallel and controlling discharge of the battery pack to the inductive load so that the auxiliary heating mechanism, the inductive load and the internal resistor heat the battery pack during a discharging stage of the battery pack; and
disconnecting the auxiliary heating mechanism from the battery pack and controlling discharge of the inductive load to the battery pack so that the inductive load and the internal resistor heat the battery pack during a charging stage of the battery pack.

2. The method according to claim 1, wherein the method further comprising:
collecting a current parameter relating to heating the battery pack; and
adjusting durations of the charging stage and the discharging stage of a charging and discharging cycle of the battery pack based on a preset desired current threshold range, so as to enable the current parameter to return to the preset desired current threshold range, when the current parameter relating to heating the battery pack exceeds the preset desired current threshold range.

3. The method according to claim 2, wherein the durations of the charging stage and the discharging stage of the charging and discharging cycle of the battery pack are equal to each other.

4. The method according to claim 1, wherein the inductive load is a winding of a motor and a switch module in the converter is disposed to turn on or off periodically to cause the motor not to rotate.

5. The method according to claim 4, wherein the motor is a three-phase motor and the converter is a three-phase full-bridge circuit having a first phase bridge arm, a second phase bridge arm and a third phase bridge arm;
wherein during the discharging stage of the charging and discharging cycle of the battery pack, closing two or three switch modules during the discharging stage, the closed switch modules are located at different phase bridge arms, and closing at least one switch module located on an upper bridge arm and at least one switch module located on a lower bridge arm; and
during the charging stage of the charging and discharging cycle of the battery pack, disconnecting the switch modules closed during the discharging stage, and closing a switch module on a lower bridge arm or a upper bridge arm relative to the upper bridge arm or the lower bridge arm where the switch modules closed during the discharging stage are located.

6. The method according to claim 1, wherein the method comprises:
obtaining a state parameter of the battery pack;
obtaining a temperature of the converter and a temperature of a motor;
generating a heating stop request when the state parameter, the temperature of the converter or the temperature of the motor exceed a corresponding parameter security range, wherein the state parameter comprises at least one of following parameters: a voltage, a temperature, a state of charge and an insulation resistance; and
controlling all switch modules of the converter to be in an off state and disconnecting the auxiliary heating mechanism from the battery pack in response to the heating stop request.

7. The method according to claim 1, wherein the method comprises:
obtaining state information of a vehicle where the battery pack is mounted;
generating a heating stop request when the state information indicates that the vehicle is not in a heating condition, wherein the state information comprises at least one of following parameters: a vehicle starting state, a vehicle door state, collision information, a high-voltage-up state, and an ambient temperature; and
controlling all switch modules of the converter to be in an off state and disconnecting the auxiliary heating mechanism from the battery pack in response to the heating stop request.

8. The method according to claim 1, wherein the auxiliary heating mechanism comprises a heating film.

9. The method according to claim 1, wherein the auxiliary heating mechanism comprises a positive temperature coefficient (PTC) heater.

10. A battery heating system, the battery heating system comprising:
a converter, wherein a direct current end of the converter is connected to a positive electrode and a negative electrode of a battery pack, the battery pack comprises an internal resistor;
an inductive load, connected to an alternating current end of the converter;
an auxiliary heating mechanism, connected to the battery pack in parallel; and a controller, wherein the controller is respectively connected to the converter and the inductive load, and wherein the controller is configured to:
control on and off of a switch module in the converter in response to a heating request, so as to control discharging and charging between the battery pack and the inductive load;
connect the auxiliary heating mechanism and the battery pack in parallel and control discharge of the battery pack to the inductive load so that the auxiliary heating mechanism, the inductive load and the internal resistor heat the battery pack during a discharging stage of the battery pack; and
disconnect the auxiliary heating mechanism from the battery pack and control discharge of the inductive load to the battery pack so that the inductive load and the internal resistor heat the battery pack during a charging stage of the battery pack.

11. The battery heating system according to claim 10, wherein the controller is configured to:
collect a current parameter relating to heating the battery pack; and
adjust durations of the charging stage and the discharging stage of a charging and discharging cycle of the battery pack based on a preset desired current threshold range, so as to enable the current parameter to return to the preset desired current threshold range, when the current parameter relating to heating the battery pack exceeds the preset desired current threshold range.

12. The battery heating system according to claim 11, wherein the durations of the charging stage and the discharging stage of a charging and discharging cycle of the battery pack are equal to each other.

13. The battery heating system according to claim 10, wherein the inductive load is a winding of a motor, and the controller is configured to control periodic on and off of a switch module in the converter, so as to enable the motor not to rotate.

14. The battery heating system according to claim 13, wherein the motor is a three-phase motor, and the converter is a three-phase full-bridge circuit having a first phase bridge arm, a second phase bridge arm and a third phase bridge arm;
wherein the controller is configured to:
during the discharging stage of the charging and discharging cycle of the battery pack, close two or three switch modules during the discharging stage, wherein the closed switch modules are located at different phase bridge arms, and close at least one switch module located on an upper bridge arm and at least one switch module located on a lower bridge arm; and
during the charging stage of the charging and discharging cycle of the battery pack, disconnect the switch modules closed during the discharging stage, and close a switch module on a lower bridge arm or a upper bridge arm relative to the upper bridge arm or the lower bridge arm where the switch modules closed during the discharging stage.

15. The battery heating system according to claim 10, wherein the controller is configured to:
obtain a state parameter of the battery pack;
obtain a temperature of the converter and a temperature of a motor;
generate a heating stop request when the state parameter, the temperature of the converter or the temperature of the motor exceed a corresponding parameter security range, wherein the state parameter comprises at least one of following parameters: a voltage, a temperature, a state of charge and an insulation resistance; and
control all switch modules of the converter to be in an off state and disconnect the auxiliary heating mechanism from the battery pack in response to the heating stop request.

16. The battery heating system according to claim 10, wherein the controller is configured to:
obtain state information of a vehicle where the battery pack is mounted;
generate a heating stop request when the state information indicates that the vehicle is not in a heating condition, wherein the state information comprises at least one of following parameters: a vehicle starting state, a vehicle door state, collision information, a high-voltage-up state, and an ambient temperature; and
control all switch modules of the converter to be in an off state and disconnect the auxiliary heating mechanism from the battery pack in response to the heating stop request.

17. The battery heating system according to claim 10, wherein the auxiliary heating mechanism comprises a heating film.

18. The battery heating system according to claim 10, wherein the auxiliary heating mechanism comprises a positive temperature coefficient (PTC) heater.

19. An electric apparatus, the electric apparatus comprising:
a battery pack and a battery heating system;
wherein the battery heating system comprises:
a converter, wherein a direct current end of the converter is connected to a positive electrode and a negative electrode of a battery pack, the battery pack comprises an internal resistor;
an inductive load, connected to an alternating current end of the converter;
an auxiliary heating mechanism, connected to the battery pack in parallel; and
a controller, wherein the controller is respectively connected to the converter and the inductive load, and wherein the controller is configured to:
control on and off of a switch module in the converter in response to a heating request, so as to control discharging and charging between the battery pack and the inductive load;
connect the auxiliary heating mechanism and the battery pack in parallel and control discharge of the battery pack to the inductive load so that the auxiliary heating mechanism, the inductive load and the internal resistor heat the battery pack during a discharging stage of the battery pack; and
disconnect the auxiliary heating mechanism from the battery pack and control discharge of the inductive load to the battery pack so that the inductive load and the internal resistor heat the battery pack during a charging stage of the battery pack.

* * * * *